(12) United States Patent
Pigg et al.

(10) Patent No.: US 9,527,712 B1
(45) Date of Patent: Dec. 27, 2016

(54) SHOOTING HOUSE AND HOISTING SYSTEM FOR TREE

(71) Applicants: John R. Pigg, Prattville, AL (US); Thomas R. Love, Tyler, AL (US); J. Robert Pigg, Prattville, AL (US); Thomas G. Pigg, Florence, AL (US)

(72) Inventors: John R. Pigg, Prattville, AL (US); Thomas R. Love, Tyler, AL (US); J. Robert Pigg, Prattville, AL (US); Thomas G. Pigg, Florence, AL (US)

( * ) Notice: Subject to any disclaimer, the term of this patent is extended or adjusted under 35 U.S.C. 154(b) by 287 days.

(21) Appl. No.: 14/333,044

(22) Filed: Jul. 16, 2014

(51) Int. Cl.
*A01M 31/02* (2006.01)
*B66F 11/04* (2006.01)

(52) U.S. Cl.
CPC .............. *B66F 11/04* (2013.01); *A01M 31/02* (2013.01)

(58) Field of Classification Search
CPC .................................. B66F 11/04; A01M 31/02
USPC ................................................ 182/103, 141
See application file for complete search history.

(56) References Cited

U.S. PATENT DOCUMENTS

| | | | | |
|---|---|---|---|---|
| 444,280 A * | 1/1891 | Pepin | ........................ | E06C 7/16 182/103 |
| 471,245 A * | 3/1892 | McKendree | .............. | E06C 7/16 182/103 |
| 788,992 A * | 5/1905 | Bauer | ....................... | E06C 7/16 182/103 |
| 3,115,211 A * | 12/1963 | Ostrander, Jr. | ............ | E06C 7/12 182/103 |
| 3,428,145 A * | 2/1969 | Lyon | ......................... | E06C 7/16 182/103 |
| 3,630,314 A | 12/1971 | Bamburg et al. | | |
| 3,666,054 A * | 5/1972 | Ellings | ....................... | E06C 7/16 182/103 |
| 4,991,690 A | 2/1991 | Woller | | |
| 5,275,256 A * | 1/1994 | Ellzey | ........................ | E06C 7/14 104/246 |
| 5,595,265 A * | 1/1997 | Lebrocquy | ............. | A01M 31/02 187/244 |
| 5,862,827 A * | 1/1999 | Howze | ................. | A01M 31/025 135/140 |
| 5,927,440 A * | 7/1999 | Freeman | .................... | B66B 9/16 182/141 |
| 6,053,190 A | 4/2000 | Brown, Jr. et al. | | |
| 6,095,284 A * | 8/2000 | Smith | .................... | A01M 31/02 182/103 |
| 6,170,609 B1 * | 1/2001 | Dech | ...................... | A01M 31/02 182/100 |
| 6,505,707 B1 * | 1/2003 | Berry | ......................... | E06C 1/12 182/116 |
| 6,533,070 B1 * | 3/2003 | Elrod | ....................... | E06C 1/345 182/103 |
| 7,004,288 B2 * | 2/2006 | Araki | ........................ | E06C 7/12 182/103 |
| 7,168,522 B1 | 1/2007 | Price | | |

(Continued)

*Primary Examiner* — Alvin Chin-Shue
(74) *Attorney, Agent, or Firm* — George L Williamson

(57) ABSTRACT

Method and apparatus for an electrically operated shooting house for attachment to the tree which includes a motorized winch which moves the hunting stand up or down the tree using a cable system which also incorporates a sectioned ladder which is connected to the tree using a plurality of tree encircling members. The ladder includes tracks for connection of a winch and safety mechanism thereto wherein the safety mechanism prevents the shooting house from falling down the ladder when attached to a tree.

9 Claims, 3 Drawing Sheets

(56) References Cited

U.S. PATENT DOCUMENTS

| | | | |
|---|---|---|---|
| 7,823,694 B2 | 11/2010 | Motes | |
| 7,909,139 B2 * | 3/2011 | Blue | A01M 31/02 |
| | | | 182/103 |
| 8,511,433 B2 | 8/2013 | Place | |
| 8,596,416 B2 * | 12/2013 | Crew | E06C 7/12 |
| | | | 182/103 |
| 2002/0043426 A1 * | 4/2002 | Bruneau | E06C 1/10 |
| | | | 182/103 |
| 2003/0178251 A1 * | 9/2003 | Hewitt | A01M 31/02 |
| | | | 182/63.1 |
| 2005/0079037 A1 * | 4/2005 | Boyd | B60P 1/4485 |
| | | | 414/462 |
| 2007/0045046 A1 * | 3/2007 | Hayes | A01M 31/02 |
| | | | 182/63.1 |
| 2007/0256892 A1 * | 11/2007 | Breedlove, Sr. | A01M 31/02 |
| | | | 182/116 |
| 2008/0271948 A1 * | 11/2008 | Motes | A01M 31/02 |
| | | | 182/141 |
| 2009/0057057 A1 * | 3/2009 | Sracic | E06C 7/12 |
| | | | 182/141 |
| 2011/0260127 A1 | 10/2011 | Surgeon et al. | |

* cited by examiner

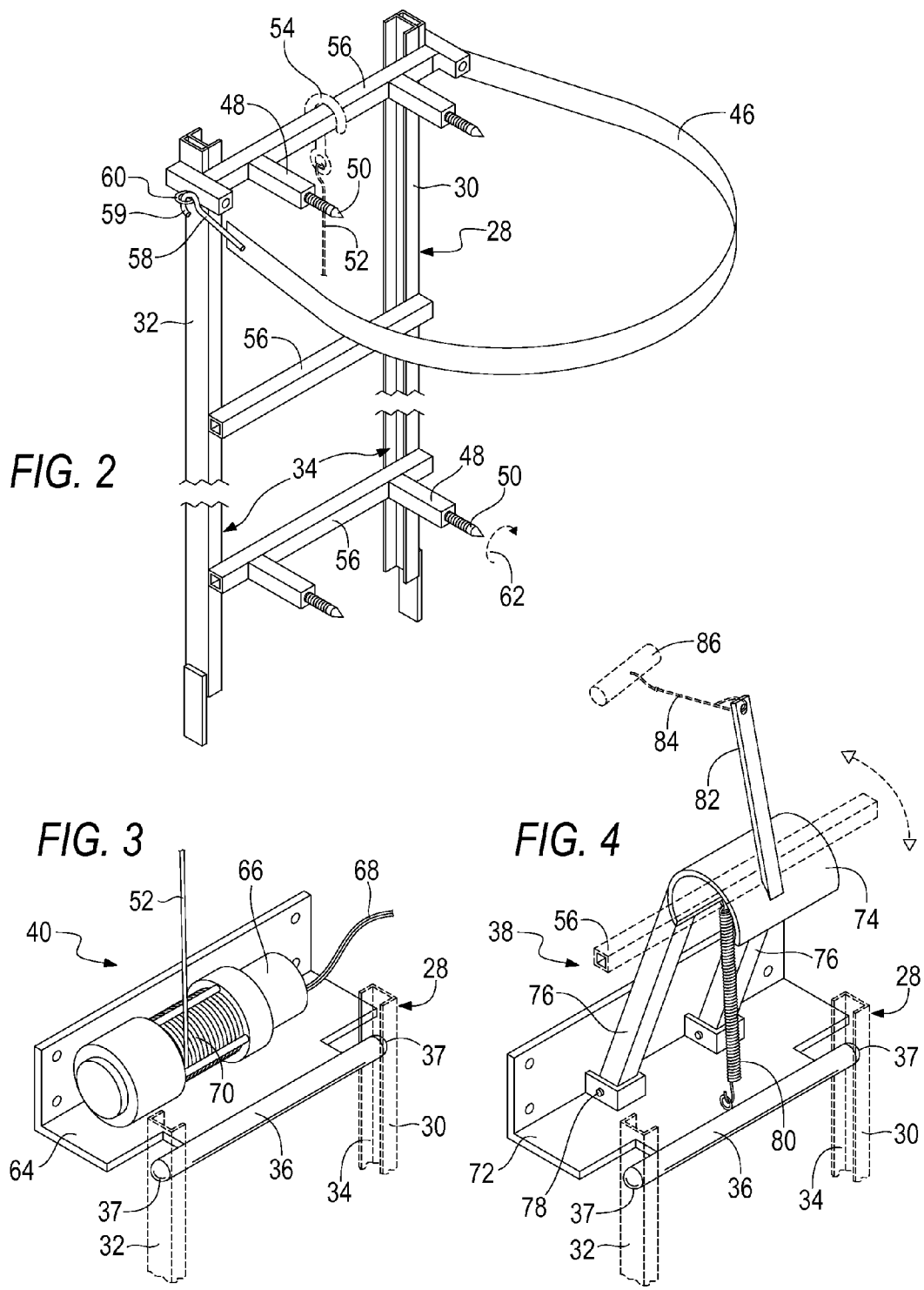

SHOOTING HOUSE AND HOISTING SYSTEM FOR TREE

BACKGROUND OF THE INVENTION

Field of the Invention

The present invention relates generally to hunting accessories and, more particularly, is concerned with a shooting house with a hoisting system for attachment to and movement up a tree.

Description of the Related Art

Devices relevant to the present invention have been described in the related art, however, none of the related art devices disclose the unique features of the present invention. In U.S. Pat. No. 3,630,314 dated Dec. 28, 1971, Bamburg, et al., disclosed a portable hunting stand. In U.S. Pat. No. 4,991,690 dated Feb. 12, 1991, Woller disclosed a portable hunting ladder. In U.S. Pat. No. 6,053,190 dated Apr. 25, 2000, Brown. Jr., et al., disclosed a two-person tree stand system for deer hunting. In U.S. Pat. No. 7,168,522 dated Jan. 30, 2007, Price disclosed a self-erecting crane for tree mounted blinds. In U.S. Pat. No. 7,823,694 dated Nov. 2, 2010, Motes disclosed a motorized, climbing hunting stand. In U.S. Pat. No. 8,511,433 dated Aug. 20, 2013, Place disclosed a tree stand hoist system. In U.S. Patent Application Publication No. 2011/0260127 dated Oct. 27, 2011, Surgeon, et al., disclosed a tree mounted hoist.

While these devices may be suitable for the purposes for which they were designed, they would not be as suitable for the purposes of the present invention as hereinafter described.

SUMMARY OF THE PRESENT INVENTION

The present invention discloses an electrically operated shooting house for attachment to the tree which includes an electrical winch which hoists the hunting stand up the tree using a cable system which also incorporates a sectioned ladder which is connected to the tree using a plurality of tree encircling members, e.g., belts, chains or the like. The ladder includes tracks for connection of a winch and safety mechanism thereto wherein the safety mechanism prevents the shooting house from falling down the ladder when attached to a tree.

This shooting house system is designed to use a tree for support and is hoisted into position by using a conventional 12-volt electric winch and secured to the tree for support.

While most shooting houses are constructed in-place, or transported to the site and permanently mounted on posts that have been concreted into the ground and never moved from the initial location, the present invention has advantages over other shooting houses including the following: a) in approximately two hours it can be transported into the woods to the tree of choice, raised, secured, and be set up to hunt; b) the transport and installation only requires two people; c) it can be easily moved if there is no game, or if you need to move it from leased property, or need to move it for any other reason; d) the shooting house can be entered by climbing the ladder and track system and going through the floor door by an able-bodied hunter; and, e) the shooting house can be lowered to the ground and entered by a disabled or wheelchair bound hunter, or anyone scared of climbing a ladder, by using the front door and then lifted into position via the electric winch with the push of a button.

Other features include a shooting house that is raised into position by a lifting system—be it a 12-volt winch, a manual winch, a chain hoist, a come-along, or any other similar battery operated or manual lifting system; the ladder and track system is used to guide the shooting house smoothly and safely up the tree into position, and support it at its final locations; and, it includes a safety or anti-fall system. The speedy, easy installation and portability of this system are two very important aspects but also important is that the front door opens for disabled hunters, elderly hunters, and those hunters who may be scared to climb ladders, or are scared of heights. A hunter who falls into any of those categories can enter the shooting house on the ground, and ride it up and down like an elevator at the push of a button.

An object of the present invention is to provide a shooting house that is portable and can be supported by a tree. A further object of the present invention is to provide a shooting house that has a lifting system for raising the shooting house which incorporates a battery-powered winch making the system easily portable from one location to another. A further object of the present invention is to provide a sectionalized ladder which includes a track system so that the shooting house can be smoothly and safely moved up and down the ladder. A further object of the present invention is to provide a shooting house which has a safety lock system on it which prevents the shooting house from falling rapidly down the ladder and tree and injuring a user.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 2 is a perspective view of portions of the present invention taken from FIG. 1.

FIG. 3 is a perspective view of portions of the present invention taken from FIG. 1.

FIG. 4 is a perspective view of portions of the present invention taken from FIG. 1.

LIST OF REFERENCE NUMERALS

Figure 1:
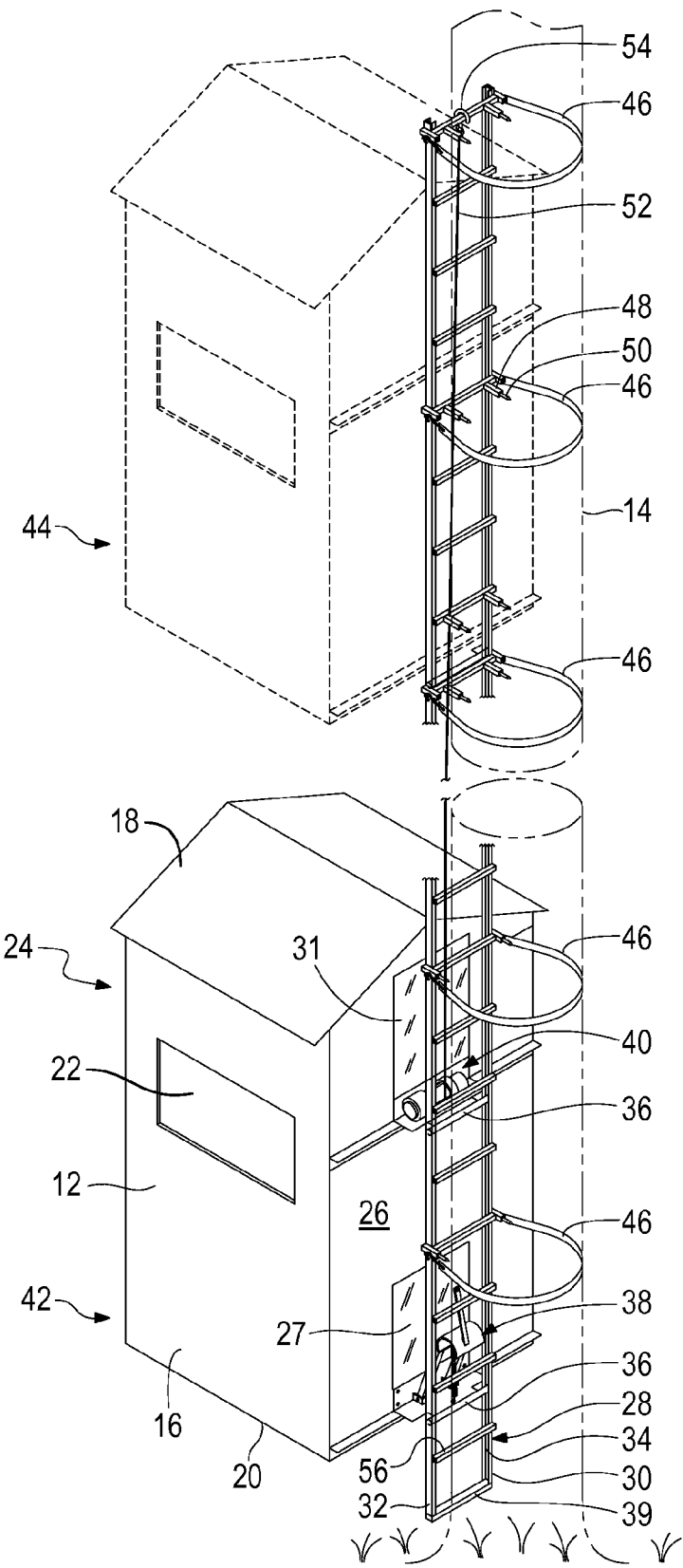
FIG. 1 is a perspective view of the present invention shown in operative connection.

With regard to reference numerals used, the following numbering is used throughout the drawings.

10 present invention
12 shooting house
14 tree
15 ground 16 side wall
18 roof
20 bottom floor
22 window opening
24 front
26 rear
27 transparent portion
28 ladder
29 aperture for tether
30 leg/sidepiece
31 removable portion
32 leg/sidepiece
34 track/channel
36 rod/crossbar
37 rounded end
38 safety mechanism
39 stop
40 winch mechanism
42 first lower position
44 second higher position
46 strap/chain
48 housing
50 adjustable tip
52 cable
54 hook
56 rung/crosspiece
58 connector
59 hook
60 ring
62 arrow
64 winch platform
66 motor
68 electrical cord
70 spool/drum
72 safety mechanism platform
74 safety catch/cup
76 legs
78 pivot
80 spring
82 extension arm
84 cord/tether
86 handle
88 battery
90 control module
92 front door
94 floor door
96 expanded metal
98 rubber
100 user
102 hand
104 backup winch system
106 mounting receptacle
108 frame member
110 mounting post
111 base frame member
112 locking pin
114 aperture
116 handle
118 drum
120 cable
122 storage box

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 6 illustrate the present invention wherein a motorized shooting house is disclosed and which is generally indicated by reference number 10.

Turning to FIG. 1, therein is shown the present invention 10 which includes a shooting house 12 attached to a tree 14 in the ground 15 wherein the shooting house is generally rectangular or cubed shaped having a plurality of side walls 16, a roof 18 and a bottom 20 wherein the shooting house may also include one or more openings 22 which serve as windows and also having a front 24 which has a swinging door thereon, along with a rear wall 26 having a lower transparent portion 27 and an upper removable portion 31 thereon. Also shown is a ladder system 28 having left 30 and right 32 leg/sidepiece portions, each leg/sidepiece portion having a track or channel 34 on their inward facing portions therein for receiving an end of a rod/crossbar 36 of either a safety latch 38 or winch 40 which are used in hoisting the shooting house 12 up and down the tree 14. Ladder 28 also has a plurality of rungs 56 and a lower stop 39 for the rod/crossbar 36. FIG. 1 generally illustrates the concept of movement of the shooting house 12 up and down tree 14 by showing the shooting house in a first lowered position at 42 and then a second raised position 44 higher up the tree 14 to an elevation which would be determined by the user of the present invention 10. The ladder 28 also is sectionalized and includes a plurality of tree encircling members 46, e.g., bands, straps, belts, chains or the like, spaced at appropriate locations that would be determined by the user during installation which encircle around the tree 14 so as to secure the ladder to the tree and wherein the ladder also has a plurality of threaded socket-like housings 48 placed on an interior side of the ladder toward the tree and each one housing a rotatable, adjustable pin-like spacer, leg, or tip 50 having mating threads thereon so that an end of the tip can pierce the bark and outer layer of the tree 14 in order to better secure the ladder 28 to the tree wherein the tips 50 can be rotated to change their length so as to make the ladder adjustable for better and more secure attachment to tree 14 and for plumbing the ladder on the tree. Also shown is a cable 52 having a hook 54 on its distal end which can be connected to a rung/crosspiece 56 of the ladder 28 (FIG. 1 shows the hook attached to the top rung of the ladder) chosen by the user so that the shooting house 12 can be placed at a suitable elevation along the length of the tree 14.

Turning to FIG. 2, therein is shown an enlarged view of portions of the present invention 10 including the ladder 28 having left and right legs 30, 32 along with a plurality of rungs or cross members 56 wherein some of the rungs may have at least one socket-like housing 48 having a rotatable tip 50 thereon wherein the pin rotation is shown by arrow 62, which tips are used to pierce the bark or skin of the tree 14 (not shown, see FIG. 1) in order to better secure the ladder 28 to the tree; also shown are bands 46 extending from the left to the right rung 30, 32 encircling the tree 14 wherein an end connector 58 having a hook 59 thereon wherein the hook on one end of the band attaches to the opposite side of the ladder by means of a ring 60, or the like. Also shown is an upper end of cable 52 having a hook 54 thereon connected to the upper rung 56. Also shown are the channels 34 or tracks on the inner facing portions of each of the left and right 30, 32 legs of the ladder 28.

Turning to FIG. 3, therein is shown the winch mechanism generally indicated by numeral 40 mounted on a winch platform 64 wherein the winch includes an electric motor 66 also showing an electrical cord 68 running from the power supply and also showing the spool or drum 70 upon which is wound the cable 52 in a conventional manner and also showing a rod/crossbar 36 having first and second ends wherein each end fits into and is secured in the track or channel 34 of the left or right legs 30, 32 of the ladder 28 which allows the shooting house 12 to move smoothly and securely up and down the tree. Rod/crossbar 36 may also have optional rounded ends 37 which allow for smoother movement in tracks 34 and minimizes binding of the rod in the track.

Figure 5:
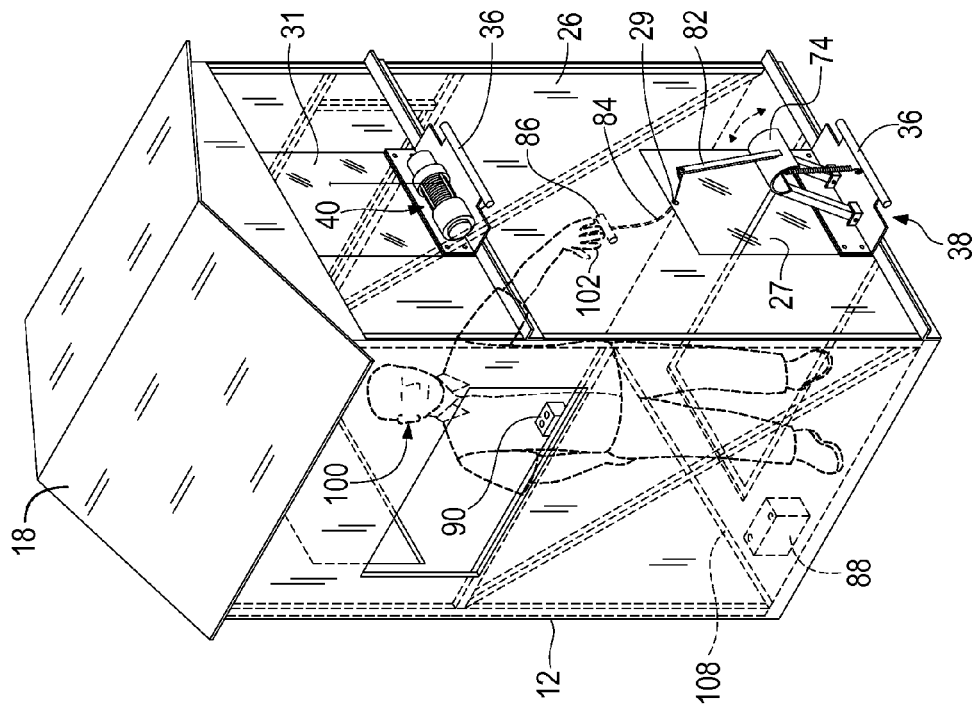
FIG. 5 is a perspective view taken from the rear of the shooting house of the present invention.

Turning to FIG. 4, therein is shown the safety mechanism generally indicated by numeral 38 which is mounted onto a safety mechanism platform 72 having at least one leg 76 being pivotally connected 78 to the platform and having a downwardly concave shaped safety catch/cup 74 which is designed to rest over and on a rung 56 of the ladder 28 as the shooting house 12 moves up and down the ladder attached to the tree 14 wherein safety catch 74 is biased toward the rung of the ladder using a spring 80 or the like. The first and second end of the rod/crossbar 36 of the safety mechanism 38 each fit in the track 34 of the left and right legs 30, 32 of the ladder 28 similarly to the winch 40. Rod/crossbar 36 also has rounded ends 37 which allow for smoother movement in tracks 34 and minimizes binding of the rod in the track. Also shown on an upper surface of the safety catch/cup 74 is an extension arm 82 having a cord/tether 84 and handle 86 attached thereto, which cord/tether and handle extend through the rear wall 26 of the shooting house 12 by passing through a Plexiglas, transparent portion 27 of the rear wall 26 of the shooting house 12. A user 100 on the inside of the shooting house 12 (as shown in FIG. 5) can move the safety mechanism 38 by grasping the handle 86 with his hand 102. In operation, a user would move the cup 74 of the safety mechanism 38 away from and toward the ladder rungs 56 as the user lowered the shooting house toward the ground.

Turning to FIG. 5, therein is shown the rear wall 26 of the present invention 10 which includes a shooting house 12 having a transparent portion 27 thereon. Also shown is a safety latch 38 or winch 40 which are used in hoisting the shooting house 12 up and down the tree 14 as previously disclosed. Also shown is a Plexiglas, transparent section 27 shown on the rear wall 26 of the shooting house 12 so that the user 100 standing inside the shooting house can observe whether the safety catch 74 of the safety mechanism 38 is connected over a rung 36 of the ladder 28 so as to prevent the shooting house from sliding down the ladder. Also shown extending upwardly from an upper surface of the safety catch/cup 74 is an extension arm 82 having a cord/tether 84 and handle 86 attached thereto, which cord/tether and handle extend through the rear wall 26 of the shooting house 12 by passing through an aperture 29 on the Plexiglas, transparent portion 27 of the rear wall 26 of the shooting house 12. A user 100 on the inside of the shooting house 12 can move the safety mechanism 38 by grasping the handle 86 with his hand 102. In operation, a user would repeatedly move the cup 74 of the safety mechanism 38 away from and toward the ladder rungs 56 as the user lowered the shooting house 12 toward the ground so that when the cup was moved away from a rung the shooting house would continue to move downward without catching the rungs and when the cup was moved toward a rung the cup would capture the rung inside its downwardly concave shaped surface to prevent further downward movement in case of a fall or descent that was too rapid. Also shown is a battery 88 and a hand operated control module 90 which would be electrically connected together and to the winch mechanism 40 and operated in the standard manner as would be done by one skilled in the art and which is used for operating and controlling the winch generally shown at 40. The control module 90 is used to actuate the winch mechanism 40 so that it will either make the shooting house 12 move up or down along the tree. Storage box 122 is for the backup winch system 104 shown in FIG. 6. Removable panel 31 is also shown on the back wall 26 along with an exemplary frame member 108 on the front wall of the shooting house 12.

Figure 6:
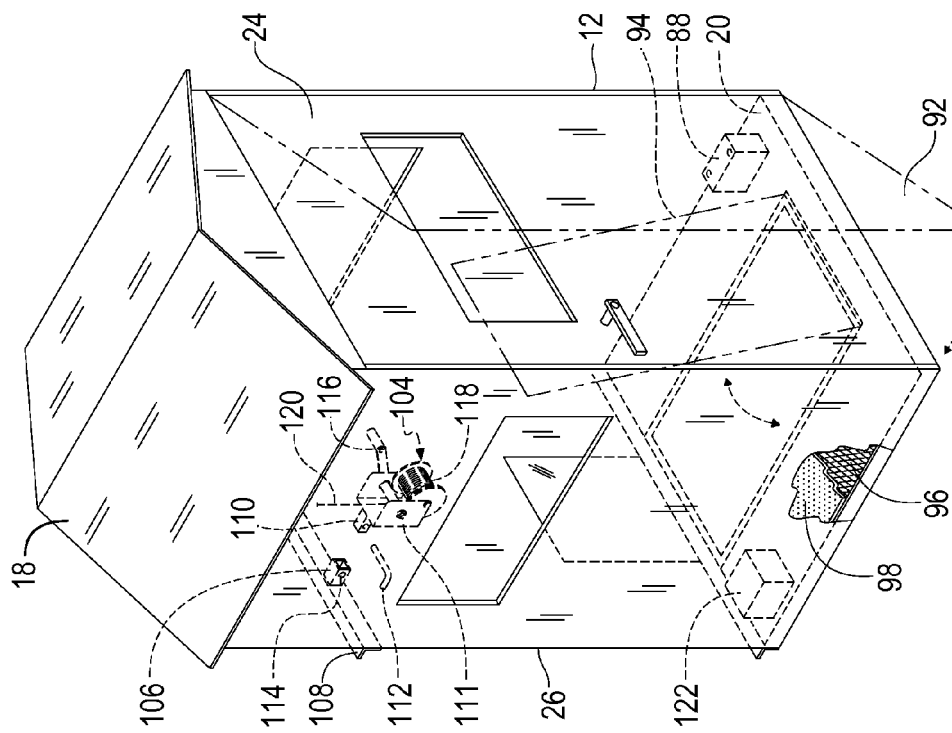
FIG. 6 is a perspective view taken from the front of the shooting house of the present invention.

Turning to FIG. 6, therein is shown the front wall 24 of the shooting house 12 showing a full length swinging door 92 on the front wall 24 which extends substantially from the bottom 20 of the shooting house to the roof 18 of the shooting house so that the shooting house is accessible by a handicapped users who might be in a wheelchair. Also shown is a pivoting bottom floor door 94 disposed in the bottom 20 of the shooting house 12 to allow users to enter and exit the shooting house when the shooting house is at an elevated position on a tree by walking up and down the ladder 28. Also shown is the construction of the bottom floor 20 of the shooting house 12 which incorporates expanded metal 96 and a rubber layer 98 which is used for soundproofing the shooting house 12 wherein the expanded metal bottom layer is attached by tack welding, bolts, or the like to the floor 20 of the shooting house 12. Also shown is an optional backup winch system 104 for use in case of failure of the main winch mechanism (not shown, see FIG. 5) including a female mounting receptacle 106 attached to a rear frame member 108 of shooting house 12 for receiving a male mounting post 110 disposed on a base frame member 111 of the backup winch system 104 wherein a locking pin 112 is used to lock the post 110 into the receptacle by insertion into mating apertures 114. The backup winch system 104 includes a generally conventional winch including a handle 116 for turning a drum 118 upon which is wound a cable 120 which would of course have a hook (not shown) attached to a distal end thereof wherein the hook could be attached to an accessible rung of the ladder by passing the hook and cable through a removable panel (see 31, FIG. 5) in the rear wall 26 of the shooting house for use when the main winch mechanism failed. The backup winch system 104 is normally kept stored in a storage box 122 mounted on the floor of the shooting house when not in use. In case of an emergency the backup winch system 104 is removed from the storage box 122 and its post 110 is inserted into and locked into the receptacle 106 using pin 112 and its hook (not shown) is then attached to a user accessible appropriate rung of the ladder so that the shooting house can then be manually lowered to the ground by first raising the shooting house to release the safety mechanism and then allowing the shooting house to be lowered to the ground. Note that the backup winch system 104 is equipped with an anti-reverse lock that will prevent the backup winch from free-wheeling in reverse due to the weight of the shooting house 12.

By way of additional explanation and with reference to FIGS. 1-6, the present invention 10 comprises a framework made of various shapes, e.g., square or metal tubing, and has a floor door 94 for entry from the bottom and the entire front wall 24 of the shooting house is also a door 92. The floor door 94 can be utilized by hunters who wish to leave the shooting house 12 in the upper position, and enter it by climbing up the ladder 28 and entering through the floor door. Disabled hunters, or those who would rather enter at ground level for any reason, can enter by using front door 92. The winch 40, battery 88 and safety mechanism 38 are all very securely bolted into the framework of the shooting house 12 structure. To keep weight down, the walls and roof of the shooting house 12 are made of lightweight, but very strong and durable, corrugated plastic. The ladder 28 is securely fastened to a tree 14 which is 10 inches or larger at the base, and which is as straight as possible. This ladder 28 and track 34 provides a secure rail for the shooting house 12 to ride up and down the tree 14 on, plus a ladder for entry and exit for those who do not wish to ride the shooting house up and down like an elevator.

The general procedure for using the present invention 10 includes the following: (a) choose a tree 14 being 10 inches in diameter minimum and as straight as possible; (b) join the sections of ladder 28 together and lean them against the tree. (c) one person, wearing a safety belt, secures the ladder to the tree by normally strapping 46 the ladder properly all the way up the tree; (e) the shooting house 12 is carried and set in place and attached to the ladder 28 and track 34; (d) the winch 40 and safety system or mechanism 38 are already strapped into place; (e) the battery 88 is hooked up; and, (f) the users 100 enter the shooting house and ride to the top using controller 90.

Direction arrows may be used throughout this specification to show direction of movement, or other activity/action described herein.

We claim:

1. An apparatus for a shooting house and hoisting system for attachment to a tree, comprising:
   a) a ladder, said ladder for being secured to the tree, said ladder having upper and lower ends and first and second sidepieces, a plurality of rungs spaced apart between said upper and lower ends and said first and second sidepieces;
   b) a plurality of legs disposed on and spaced apart along said first and second sidepieces of said ladder, wherein said legs are disposed on a side of said ladder facing toward the tree, wherein said legs are adjustable in length for spacing said ladder away from the tree;
   c) a plurality of tree encircling members for removably securing said ladder to the tree, wherein said members are spaced apart along said ladder, wherein said members have a first end connected to said first sidepiece of said ladder and a second end connected to said second sidepiece of said ladder;
   d) a shooting house removably secured to said ladder, said shooting house having front and rear side portions, wherein said shooting house is adapted to be movable up and down said ladder;
   e) a winch mechanism disposed on said rear side portion of said shooting house, said winch mechanism including a drum upon which a cable is wound and having a hook disposed on a distal end of said cable, wherein said hook is removably attached to a rung of said ladder above said winch mechanism so that when said cable is wound onto said drum said shooting house moves upwardly along said ladder;
   f) a safety mechanism disposed on said rear side portion of said shooting house for selective engagement with a rung of said ladder for securing said shooting house to said ladder against moving down said ladder, wherein said safety mechanism is disposed underneath said winch mechanism; and,
   g) each of said winch and safety mechanisms mounted on platforms extending out from said shooting house toward said ladder and attached to a crossbar sliding in tracks in facing sides of said sidepieces of said said shooting house to said ladder.

2. The apparatus of claim 1, wherein each said leg has a threaded female portion and a threaded male portion so that when said male portion is rotated in said female portion the length of said leg is adjusted.

3. The apparatus of claim 1, further comprising a first door disposed in a floor of said shooting house so that a uer can enter said shooting house through said first door.

4. The apparatus of claim 3, further comprising a second door disposed in said front side portion of said shooting house so that a user can enter said shooting house through said second door.

5. The apparatus of claim 1, further comprising a spring disposed on said safety mechanism for biasing said safety mechanism into selective engagement with a rung of said ladder.

6. An apparatus for a shooting house and hoisting system for attachment to a tree, comprising:
   a) a ladder, said ladder for being secured to the tree, said ladder having upper and lower ends and first and second sidepieces, a plurality of rungs spaced apart between said upper and lower ends and said first and second sidepieces;
   b) a plurality of spaced legs disposed on and spaced apart along said first and second sidepieces of said ladder, wherein said legs are disposed on a side of said ladder facing toward the tree, wherein said legs are adjustable in length for spacing said ladder away from the tree;
   c) a plurality of tree encircling members for removably securing said ladder to the tree, wherein said members are spaced apart along said ladder, wherein said members have a first end connected to said first sidepiece of said ladder and a second end connected to said second sidepiece of said ladder;
   d) a shooting house removably secured to said ladder, said shooting house having front and rear side portions, wherein said shooting house is adapted to be movable up and down said ladder;
   e) a winch mechanism disposed on said rear side portion of said shooting house, said winch mechanism including a drum upon which a cable is wound and having a hook disposed on a distal end of said cable, wherein said hook is removably attached to a rang of said ladder above said winch mechanism so that when said cable is wound onto amid drum said shooting house moves upwardly along said ladder;
   f) a safety mechanism disposed on said rear side portion of said shooting house, a cup member disposed on said safety mechanism for selective engagement with a rung of said ladder so that when said cup member is engaged with said rung of said ladder said shooting house is secured to said ladder so that said shooting house cannot move down said ladder, wherein said safety mechanism is disposed underneath said winch mechanism; and,
   g) a first crossbar disposed on said winch mechanism, said first crossbar having first and second ends, wherein said first end of said first crossbar is disposed in a track of said first sidepiece and said second and of said first crossbar is disposed in a track of said second sidepiece so as to secure said first crossbar to said ladder.

7. The apparatus of claim 6, wherein said first and second ends of said first crossbar are rounded.

8. An apparatus for a shooting house and hoisting system for attachment to a tree, comprising:

a) a ladder, said ladder for being secured to the tree, said ladder having upper and lower ends and first and second sidepieces, a plurality of rungs spaced apart between said upper and lower ends and said first and second sidepieces;
b) a plurality of spaced legs disposed on and spaced apart along said first and second sidepieces of said ladder, wherein said legs are disposed on a side of said ladder facing toward the tree, wherein said legs are adjustable in length for spacing said ladder away from the tree;
c) a plurality of tree encircling members for removably securing said ladder to the tree, wherein said members are spaced apart along said ladder, wherein said members have a first end connected to said first sidepiece of said ladder and a second and connected to said second sidepiece of said ladder;
d) a shooting house removably secured to said ladder, said shooting house having front and rear side portions, wherein said shooting house is adapted to be movable up and down said ladder;
e) a winch mechanism disposed on said rear side portion of said shooting house, said winch mechanism including a drum upon which a cable is wound and having a hook disposed on a distal end of said cable, wherein said hook is removably attached to a rung of said ladder above said winch mechanism so that when said cable is wound onto said drum said shooting house moves upwardly along said ladder; and,
f) a safety mechanism disposed on said rear side portion of said shooting house, a cup member disposed on said safety mechanism for selective engagement with a rung of said ladder so that when said cup member is engaged with said rung of said ladder said shooting house is secured to said ladder so that said shooting house cannot move down said ladder, wherein said safety mechanism is disposed underneath said winch mechanism, further comprising a second crossbar disposed on said safety mechanism, said second crossbar having first and second ends, wherein said first end of said second crossbar is disposed in a track of said first sidepiece and said second end of said second crossbar is disposed in a track of said second sidepiece so as to secure said second crossbar to said ladder.

9. The apparatus of claim 8, wherein said first and second ends of said second crossbar are rounded.

\* \* \* \* \*